(12) United States Patent
Imanishi et al.

(10) Patent No.: US 11,658,345 B2
(45) Date of Patent: May 23, 2023

(54) NONAQUEOUS ELECTROLYTE SECONDARY BATTERY

(71) Applicant: SANYO Electric Co., Ltd., Daito (JP)

(72) Inventors: Yosuke Imanishi, Nara (JP); Atsushi Mizawa, Hyogo (JP); Takaki Nakao, Osaka (JP)

(73) Assignee: SANYO Electric Co., Ltd., Osaka (JP)

(*) Notice: Subject to any disclaimer, the term of this patent is extended or adjusted under 35 U.S.C. 154(b) by 206 days.

(21) Appl. No.: 16/769,445

(22) PCT Filed: Nov. 26, 2018

(86) PCT No.: PCT/JP2018/043387
§ 371 (c)(1),
(2) Date: Jun. 3, 2020

(87) PCT Pub. No.: WO2019/111742
PCT Pub. Date: Jun. 13, 2019

(65) Prior Publication Data
US 2020/0373626 A1    Nov. 26, 2020

(30) Foreign Application Priority Data
Dec. 8, 2017    (JP) .............................. JP2017-235897

(51) Int. Cl.
*H01M 10/0587* (2010.01)
*H01M 10/0525* (2010.01)
*H01M 50/469* (2021.01)

(52) U.S. Cl.
CPC ... *H01M 10/0587* (2013.01); *H01M 10/0525* (2013.01); *H01M 50/469* (2021.01)

(58) Field of Classification Search
CPC ................................................. H01M 10/0587
See application file for complete search history.

(56) References Cited

U.S. PATENT DOCUMENTS

2004/0265700 A1* 12/2004 Ugawa .............. H01M 10/0525
429/94
2009/0297929 A1   12/2009 Uchida
(Continued)

FOREIGN PATENT DOCUMENTS

CN    1527433 A   9/2004
CN  101743661 A   6/2010
(Continued)

OTHER PUBLICATIONS

International Search Report dated Dec. 25, 2018, issued in counterpart International Application No. PCT/JP2018/043387 (2 pages).
(Continued)

*Primary Examiner* — Ula C Ruddock
*Assistant Examiner* — Thomas H. Parsons
(74) *Attorney, Agent, or Firm* — WHDA, LLP

(57) ABSTRACT

The present disclosure aims to provide a nonaqueous electrolyte secondary battery in which electrode plate deformation in association with charge/discharge cycles is suppressed. A nonaqueous electrolyte secondary battery which is one example of an embodiment of the present disclosure includes a winding type electrode body (14). The electrode body (14) is provided with a tape (50) adhered to an exposed portion (42) which is provided at an outermost circumferential surface and at which a negative electrode collector is exposed. The tape (50) is adhered to the exposed portion (42) so as not to be overlapped with at least one of a winding-finish side end (31*e*) of positive electrode mixture layers and a winding-finish side end (41*e*) of negative electrode mixture layers in a radius direction of the electrode body (14).

4 Claims, 5 Drawing Sheets

(56) References Cited

U.S. PATENT DOCUMENTS

| | | | |
|---|---|---|---|
| 2010/0233525 | A1 | 9/2010 | Kaiduka et al. |
| 2010/0255357 | A1 | 10/2010 | Baek et al. |
| 2017/0084958 | A1 | 3/2017 | Ueda |

FOREIGN PATENT DOCUMENTS

| | | | |
|---|---|---|---|
| CN | 101834308 | A | 9/2010 |
| CN | 106030890 | A | 10/2016 |
| JP | 3466631 | * | 11/2003 |
| JP | 3466631 | B2 * | 11/2003 |
| JP | 2008-91076 | A | 4/2008 |
| JP | 2009-199974 | A | 9/2009 |
| JP | 2010-212086 | A | 9/2010 |
| JP | 2010-533952 | A | 10/2010 |
| JP | 2013-004195 | A | 1/2013 |
| JP | 2015-069730 | A | 4/2015 |
| JP | 2017-059395 | A | 3/2017 |
| WO | 2015/146076 | A1 | 10/2015 |

OTHER PUBLICATIONS

The Extended (Supplementary) European Search Report dated Dec. 16, 2020, issued in counterpart EP Application No. 18886769.1. (7 Pages).

English Translation of Chinese Office Action dated Feb. 11, 2023 for the related Chinese Patent Application No.201880078057.X. (5 pages).

* cited by examiner

NONAQUEOUS ELECTROLYTE SECONDARY BATTERY

TECHNICAL FIELD

The present disclosure relates to a nonaqueous electrolyte secondary battery.

BACKGROUND ART

A nonaqueous electrolyte secondary battery, such as a lithium ion battery, has been used as a power source for an electric automobile, a large-scale power storage facility, or the like. As an electrode body forming a nonaqueous electrolyte secondary battery, a winding type electrode body in which a positive electrode and a negative electrode are spirally wound with separators interposed therebetween may be mentioned. In general, to an outermost circumferential surface of the winding type electrode body, a winding-stop tape to maintain a winding structure of the electrode body is adhered (see PTLs 1 and 2).

CITATION LIST

Patent Literature

PTL 1: Japanese Published Unexamined Patent Application No. 2010-212086
PTL 2: Japanese Published Unexamined Patent Application No. 2009-199974

SUMMARY OF INVENTION

Technical Problem

Incidentally, in association with charge/discharge cycles of a nonaqueous electrolyte secondary battery, an electrode body is expanded, and a pressure from an exterior package can is applied to the electrode body. In this case, electrode plate deformation in which an electrode plate forming the electrode body is bent may occur in some cases (see FIG. 8 which will be described later). In addition, when a large electrode plate deformation is generated, an internal short circuit may arise in some cases. In a nonaqueous electrolyte secondary battery, to sufficiently suppress the electrode plate deformation which may cause an internal short circuit in some case is an important subject.

Solution to Problem

A nonaqueous electrolyte secondary battery according to an aspect of the present disclosure is a nonaqueous electrolyte secondary battery which comprises a winding type electrode body including a positive electrode composed of positive electrode mixture layers provided on two surfaces of a positive electrode collector, a negative electrode composed of negative electrode mixture layers provided on two surfaces of a negative electrode collector, and at least one separator provided between the positive electrode and the negative electrode. In the nonaqueous electrolyte secondary battery described above, the electrode body has an exposed portion at which the negative electrode collector is exposed at an outermost circumferential surface and is provided with at least one tape which is adhered to the outermost circumferential surface so as to extend from a winding-finish side end portion of the negative electrode and past a winding-finish end of the electrode body, and the tape is adhered to the outermost circumferential surface of the electrode body so as not to be overlapped with at least one of a winding-finish side end of the positive electrode mixture layers and a winding-finish side end of the negative electrode mixture layers in a radius direction of the electrode body.

Advantageous Effects of Invention

According to the nonaqueous electrolyte secondary battery of the aspect of the present disclosure, the electrode plate deformation which may cause an internal short circuit in some cases can be sufficiently suppressed.

DESCRIPTION OF EMBODIMENTS

As described above, in the nonaqueous electrolyte secondary battery including a winding type electrode body, to sufficiently suppress the electrode plate deformation which may cause an internal short circuit in some cases is an important subject. Through intensive research carried out by the present inventors, it was found that a tape to be adhered to an outermost circumferential surface of the electrode body has a significant contribution to the electrode plate deformation. In addition, it was also found that when the tape is adhered to a position other than that to be overlapped with at least one of a winding-finish side end of positive electrode mixture layers and a winding-finish side end of negative electrode mixture layers in a radius direction of the electrode body, the electrode plate deformation can be suppressed. Since the mixture layer is thick as compared to the collector, and since a step is formed at the winding-finish side end of the mixture layers, it is believed that a stress to be generated in association with the expansion of the electrode body is concentrated on the winding-finish side end and is partially responsible for the electrode plate deformation. When the tape is disposed at a position other than that to be overlapped with the winding-finish side end of the mixture layers, it is supposed that the concentration of the stress as described above can be reduced, and the electrode plate deformation can be suppressed.

Hereinafter, one example of the embodiment of the present disclosure will be described in detail. In the following description, as one example of the embodiment of a nonaqueous electrolyte secondary battery according to the present disclosure, although a cylindrical battery in which a winding type electrode body 14 is received in a cylindrical battery case 15 will be described by way of example, the battery may be, for example, a square battery including a square battery case or a laminate battery including a battery case formed of a laminate sheet in which at least one metal layer and at least one resin layer are laminated to each other. In addition, in the present specification, for the convenience of illustration, a sealing body 17 side of the battery case 15 is described as "upper (side)", and a bottom portion side of an exterior package can 16 will be described as "lower (side)".

Figure 1:
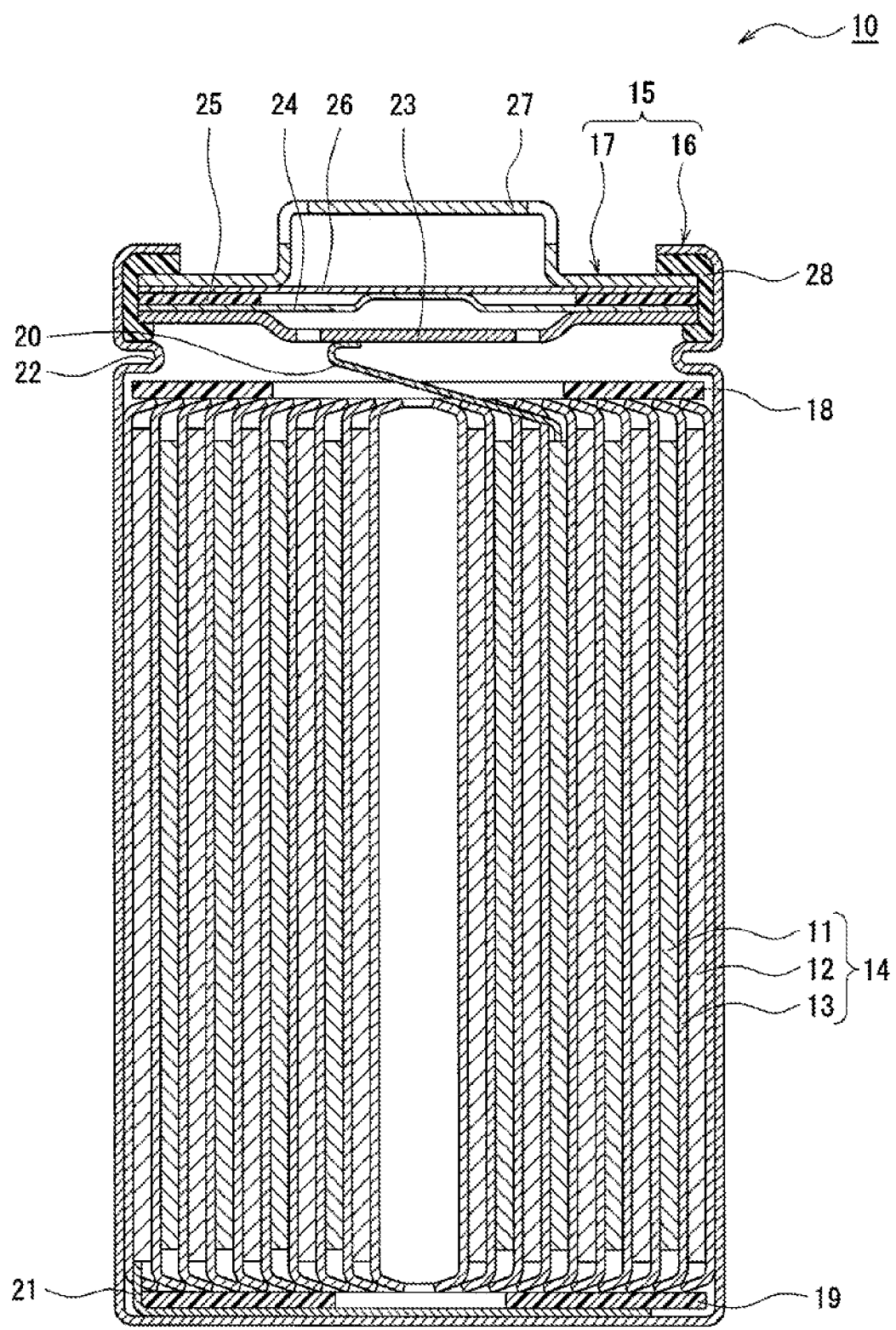
FIG. 1 is a longitudinal direction cross-sectional view of a nonaqueous electrolyte secondary battery which is one example of an embodiment.
Figure 2:
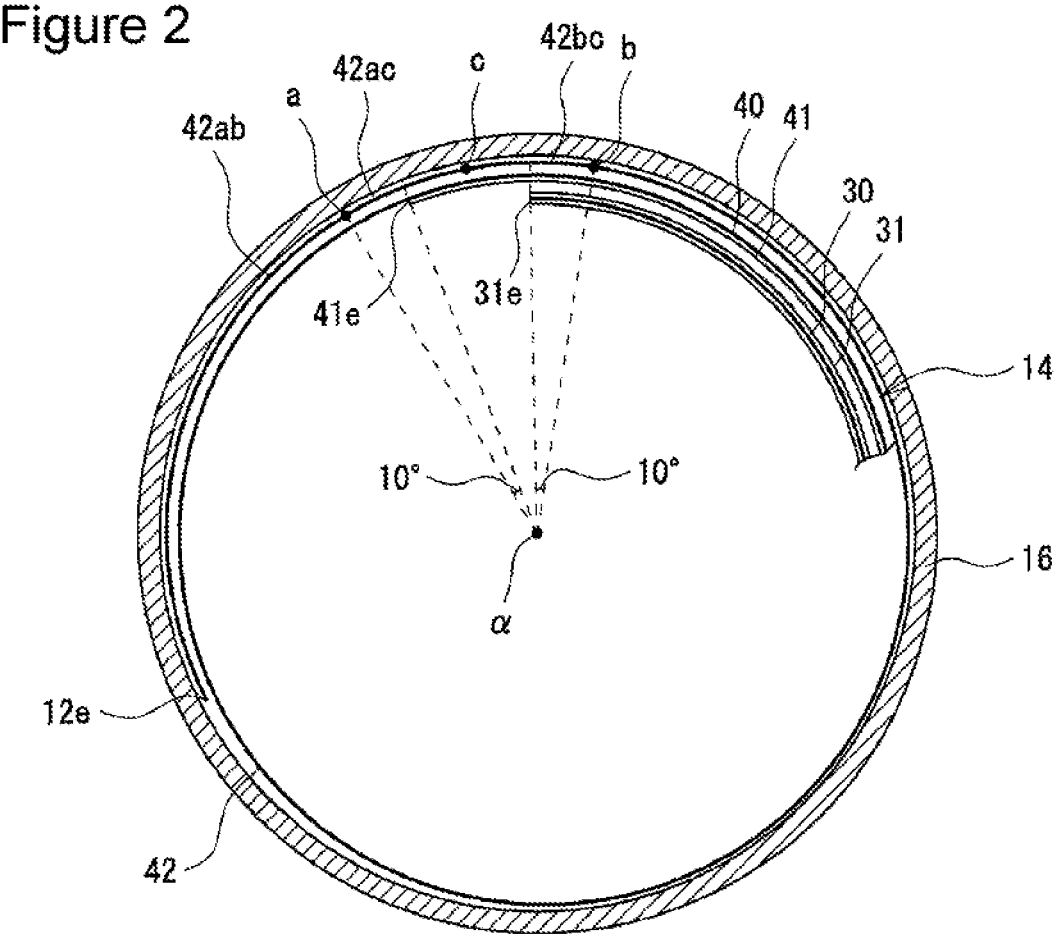
FIG. 2 is a lateral direction cross-sectional view of the nonaqueous electrolyte secondary battery which is one example of the embodiment.

FIG. 1 is a longitudinal direction (axial direction) cross-sectional view of a nonaqueous electrolyte secondary battery 10 which is one example of the embodiment, and FIG. 2 is a lateral direction (radius direction) cross-sectional view of the nonaqueous electrolyte secondary battery 10. As shown in FIGS. 1 and 2 by way of example, the nonaqueous electrolyte secondary battery 10 includes an electrode body 14, a nonaqueous electrolyte (not shown), and a battery case 15 which receives the electrode body 14 and the nonaqueous electrolyte. The electrode body 14 is formed of a positive electrode 11 in which positive electrode mixture layers 31 are provided on two surfaces of a positive electrode collector 30, a negative electrode 12 in which negative electrode mixture layers 41 are provided on two surfaces of a negative electrode collector 40, and at least one separator 13 interposed between the positive electrode 11 and the negative electrode 12. The electrode body 14 has a winding structure in which the positive electrode 11 and the negative electrode 12 are spirally wound with the separator 13 interposed therebetween. The battery case 15 is formed of a bottom-closed exterior package can 16 and a sealing body 17 which seals an opening portion of the exterior package can 16. In addition, the nonaqueous electrolyte secondary battery 10 also includes a resin-made gasket 28 disposed between the exterior package can 16 and the sealing body 17.

The nonaqueous electrolyte contains a nonaqueous solvent and an electrolyte salt dissolved in the nonaqueous solvent. As the nonaqueous solvent, for example, there may be mentioned an ester, an ether, a nitrile, an amide, or a mixed solvent containing at least two of those mentioned above. The nonaqueous solvent may also include a halogen substituent in which at least one hydrogen atom of each of those solvents mentioned above is replaced by a halogen atom, such as fluorine. In addition, the nonaqueous electrolyte is not limited to a liquid electrolyte, and a solid electrolyte using a gel polymer or the like may also be used. As the electrolyte salt, for example, a lithium salt, such as $LiPF_6$, is used.

The electrode body 14 is formed of a long positive electrode 11, a long negative electrode 12, two long separators 13, a positive electrode tab 20 bonded to the positive electrode 11, and a negative electrode tab 21 bonded to the negative electrode 12. In order to suppress precipitation of lithium, the negative electrode 12 is formed one size larger than the positive electrode 11. That is, the negative electrode 12 is formed longer than the positive electrode 11 in a longitudinal direction and in a lateral direction (up-to-down direction). The two separators 13 are each formed at least one size larger than the positive electrode 11, for example, so as to sandwich the positive electrode 11.

On the top and the bottom of the electrode body 14, insulating plates 18 and 19 are disposed, respectively. In the example shown in FIG. 1, the positive electrode tab 20 fitted to the positive electrode 11 extends to a sealing body 17 side through a through-hole of the insulating plate 18, and the negative electrode tab 21 fitted to the negative electrode 12 extends to a bottom portion side of the exterior package can 16 along the outside of the insulating plate 19. The positive electrode tab 20 is connected to a bottom surface of a filter 23 functioning as a bottom plate of the sealing body 17 by welding or the like, and a cap 27 functioning as a top plate of the sealing body 17 electrically connected to the filter 23 is used as a positive electrode terminal. The negative electrode tab 21 is connected to an inner surface of the bottom portion of the exterior package can 16 by welding or the like, and the exterior package can 16 is used as a negative electrode terminal.

The exterior package can 16 is, for example, a bottom-closed cylindrical metal-made container. As described above, between the exterior package can 16 and the sealing body 17, the gasket 28 is provided, and an inner space of the battery case 15 is sealed. The exterior package can 16 has a groove portion 22 to support the sealing body 17, the groove portion being formed, for example, by pressing a side surface portion from the outside. The groove portion 22 is preferably formed to have a ring shape along a circumferential direction of the exterior package can 16, and an upper surface of the groove portion 22 supports the sealing body 17. In addition, an upper end portion of the exterior package can 16 is bent inside and is caulked with a circumferential portion of the sealing body 17.

The sealing body 17 has the structure in which the filter 23, a lower valve 24, an insulating member 25, an upper valve 26, and the cap 27 are laminated in this order from an electrode body 14 side. The members forming the sealing body 17 each have, for example, a disc shape or a ring shape and are electrically connected to each other except for the insulating member 25. The lower valve 24 and the upper valve 26 are connected to each other at the central portions thereof, and between the peripheral portions thereof, the insulating member 25 is provided. When an inside pressure of the battery is increased by abnormal heat generation, since the lower valve 24 is deformed so as to push up the upper valve 26 toward a cap 27 side and is fractured, an electric current path between the lower valve 24 and the upper valve 26 is blocked. When the inside pressure is further increased, the upper valve 26 is fractured, and a gas is exhausted from an opening portion of the cap 27.

In this embodiment, the positive electrode tab 20 is provided at a position which is a central portion of the positive electrode 11 in the longitudinal direction and which is apart from a winding-start side end and a winding-finish side end of the electrode body 14. On the other hand, the negative electrode tab 21 is provided at one end portion of the negative electrode 12 in the longitudinal direction which is located at a winding-finish side of the electrode body 14. In addition, the arrangement of the electrode tabs is not particularly limited, and for example, besides the negative electrode tab 21, another negative electrode tab may also be provided at the other end portion of the negative electrode 12 in the longitudinal direction which is located at a winding-start side of the electrode body 14.

In this embodiment, one end of the positive electrode 11 in the longitudinal direction located at the winding-finish side of the electrode body 14 is regarded as a winding-finish side end of the positive electrode 11, and one end of the negative electrode 12 in the longitudinal direction located at the winding-finish side of the electrode body 14 is regarded as a winding-finish side end 12*e* of the negative electrode 12. In addition, the other end of the positive electrode 11 in the longitudinal direction located at the winding-start side of the electrode body 14 is regarded as a winding-start side end of the positive electrode 11, and the other end of the negative electrode 12 in the longitudinal direction located at the winding-start side of the electrode body 14 is regarded as a winding-start side end of the negative electrode 12. As is the case described above, one end of each of the negative electrode mixture layers 41 in the longitudinal direction located at the winding-finish side of the electrode body 14 is regarded as a winding-finish side end 41e of the negative electrode mixture layers 41. In this embodiment, the winding-finish side end of the positive electrode 11 coincides with a winding-finish side end 31e of the positive electrode mixture layers 31.

As shown in FIG. 2, the positive electrode 11 includes a belt-shaped positive electrode collector 30 and positive electrode mixture layers 31 formed on two surfaces of the above collector. In the positive electrode 11, an exposed portion at which the surface of the positive electrode collector is exposed is formed, for example, at a central portion of the collector in a longitudinal direction thereof, and the positive electrode tab 20 is bonded to the exposed portion described above. The positive electrode mixture layer 31 is formed of a positive electrode active material, an electrically conductive agent, and a binding agent. As the positive electrode active material, for example, a lithium composite metal oxide containing at least one transition metal element selected from Co, Mn, and Ni may be mentioned. The lithium composite metal oxide may contain at least one different type of metal element, such as Al, Mg, or Zr.

The negative electrode 12 includes a belt-shaped negative electrode collector 40 and negative electrode mixture layers 41 formed on two surfaces of the above negative electrode collector. The negative electrode mixture layer 41 is formed of a negative electrode active material and a binding agent, and if needed, an electrically conductive agent may also be contained. The negative electrode active material is not particularly limited as long as being capable of reversibly occluding and releasing lithium ions, and for example, a carbon material, such as a natural graphite or an artificial graphite, a lithium titanium composite oxide, a metal, such as Si or Sn, which forms an alloy with lithium, or a composite oxide may be used.

At the outermost circumferential surface of the electrode body 14, an exposed portion 42 at which the surface of the negative electrode collector 40 is exposed is provided. In the nonaqueous electrolyte secondary battery 10, when the exposed portion 42 is in contact with an inner surface of the exterior package can 16 which is the negative electrode terminal, the negative electrode 12 and the negative electrode terminal are electrically connected to each other, so that a preferable current collection property can be secured. In addition, the negative electrode tab 21 is connected to the exposed portion 42 by welding or the like. When the negative electrode tab 21 is used, the current collection property of the negative electrode 12 is improved. On the other hand, since the current collection property of the negative electrode 12 can be secured by the contact between the exposed portion 42 and the exterior package can 16, the structure using no negative electrode tab 21 may also be formed. In this case, for example, the volume of the electrode body 14 can be increased in an amount corresponding to the thickness of the tab, and hence, an increase in capacity of the battery can be performed.

Although the exposed portion 42 may be partially provided at the outermost circumferential surface of the electrode body 14, and, for example, although the separator 13 extending from a winding inner surface of the winding-finish side end 12e of the negative electrode 12 may be partially present at the outermost circumferential surface of the electrode body 14, the exposed portion 42 is preferably provided at the entire outermost circumferential surface in the state in which at least one tape 50 which will be described later is not adhered. In this embodiment, a portion of the exposed portion 42 at which the negative electrode mixture layers 41 are not formed on the two surfaces of the negative electrode collector 40 is provided to have a length corresponding to one circumferential length of the electrode body 14 or more. However, a portion of the exposed portion 42 at which the negative electrode mixture layer 41 is not formed only on a winding outer surface of the negative electrode collector 40 may be disposed at the outermost circumferential surface of the electrode body 14.

As the separator 13, a porous sheet having an ion permeability and an insulating property is used. The separator 13 may have either a monolayer structure or a multilayer structure and may be formed, for example, from a polyolefin resin, such as a polyethylene or a polypropylene, or a cellulose. When a polyolefin resin is used, a heat resistant layer is preferably provided by applying an aramid resin on a substrate surface formed from a polyolefin resin. The heat resistant layer may also be formed by using a resin containing ceramic particles.

Hereinafter, the structure of the electrode body 14, in particular, the tape 50 to be adhered to the outermost circumferential surface of the electrode body 14, will be described in detail.

To the outermost circumferential surface of the electrode body 14, the tapes 50 (see FIG. 3) are each adhered so as to extend from a winding-finish side end portion (the winding-finish side end 12e and the vicinity thereof) of the negative electrode 12 and past a winding-finish end of the electrode body 14. The tape 50 is a winding-stop tape to maintain the winding structure of the electrode body 14. When the exposed portion 42 is provided at the entire outermost circumferential surface of the electrode body 14, the winding-finish side end 12e of the negative electrode 12 functions as the winding-finish end of the electrode body 14. When the separator 13 is partially present at the outermost circumferential surface of the electrode body 14 since extending from a winding inner surface of the winding-finish side end 12e of the negative electrode 12, a winding-finish side end of the separator 13 functions as the winding-finish end of the electrode body 14.

When the winding-finish side end portion of the negative electrode 12 is fixed using the tapes 50, the winding structure of the electrode body 14 is maintained, and for example, in a step of manufacturing the battery, the electrode body 14 can be smoothly received in the exterior package can 16. Since the exposed portion 42 at which the surface of the negative electrode collector 40 is exposed is formed at the outermost circumferential surface of the electrode body 14, the tapes 50 are adhered to the exposed portion 42. In this embodiment, the entire region of the outermost circumferential surface of the electrode body 14 is the exposed portion 42, and the tapes 50 are each adhered only to the exposed portion 42.

The tape 50 includes a substrate layer formed, for example, from an insulating organic material and an adhesive layer having an adhesive property to the electrode body 14. The tape 50 is preferably an insulating tape having substantially no electrical conductivity. The tape 50 may have a layer structure including at least three layers, and the substrate layer may be formed of at least two films of the same material or different materials. The thickness of the tape 50 is, for example, 10 to 60 μm and preferably 15 to 40 μm. In addition, in the tape 50, an inorganic filler, such as titania, alumina, silica, or zirconia, may be contained, and besides the substrate layer and the adhesive layer, a layer containing an inorganic filler may also be provided.

As a preferable resin forming the substrate layer, for example, there may be mentioned a polyester such as a poly(ethylene terephthalate) (PET), a polypropylene (PP), a polyimide (PI), a poly(phenylene sulfide) (PPS), a poly (ether imide) (PEI), or a polyamide. The adhesive layer is formed by applying an adhesive on one surface of the substrate layer. Although the adhesive forming the adhesive layer may be either a hot melt type which exhibits an adhesive property by heating or a thermosetting type which is cured by heating, in consideration of productivity and the like, an adhesive having an adhesive property at room temperature is preferable. As one example of the adhesive forming the adhesive layer, an acrylic-based adhesive or a synthetic rubber-based adhesive may be mentioned.

The tapes 50 are each adhered to the outermost circumferential surface (exposed portion 42) of the electrode body 14 so as not to be overlapped with at least one of the winding-finish side end 31e of the positive electrode mixture layers 31 and the winding-finish side end 41e of the negative electrode mixture layers 41 in the radius direction of the electrode body 14. In this embodiment, the winding-finish side end of the positive electrode 11 coincides with the winding-finish side end 31e of the positive electrode mixture layers 31. Since the tapes 50 are each adhered to a position other than that to be overlapped with the winding-finish side ends 31e and 41e of the mixture layers, the electrode plate deformation in association with the expansion of the electrode body 14 is suppressed.

Figure 3:
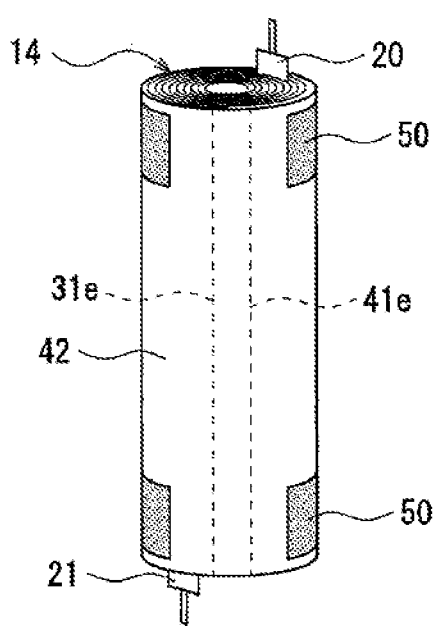
FIG. 3 is a perspective view of an electrode body of one example of the embodiment.
Figure 4:
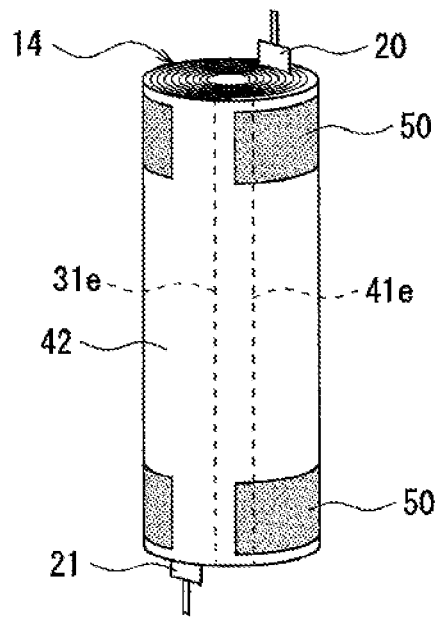
FIG. 4 is a perspective view of an electrode body which is another example of the embodiment.
Figure 5:
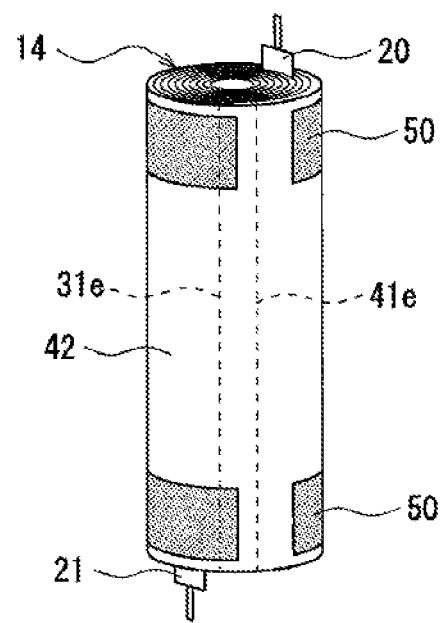
FIG. 5 is a perspective view of an electrode body which is another example of the embodiment.

In the example shown in FIG. 3, the tapes 50 are each adhered to the outermost circumferential surface of the electrode body 14 so as not to be overlapped with the winding-finish side end 31e of the positive electrode mixture layers 31 and the winding-finish side end 41e of the negative electrode mixture layers 41 in the radius direction of the electrode body 14. That is, the tapes 50 are each adhered to the outermost circumferential surface of the electrode body 14 so as to extend from the winding-finish side end portion of the negative electrode 12 and past the winding-finish side end 12e of the negative electrode 12 which is the winding-finish end of the electrode body 14 and are each disposed so as not to be overlapped with the winding-finish side ends 31e and 41e of the mixture layers in the radius direction of the electrode body 14. The tape 50 is formed to have a long and narrow shape and is adhered so that the longitudinal direction thereof is along the circumferential direction of the electrode body 14. The tapes 50 are each adhered along the circumferential direction of the electrode body 14 so as to cover, for example, at least 50% of the circumferential length of the outermost circumferential surface and preferably at least 80% thereof.

The tapes 50 are each preferably adhered to at least a part of a range of 15 mm from one of two ends of the electrode body 14 in the axial direction. Since the tapes 50 are each adhered to one of two end portions of the electrode body 14 in the axial direction, and in particular, since the tape 50 is adhered to a lower end portion, when the electrode body 14 is inserted in the exterior package can 16, the end portions of the electrode body 14 are prevented from being brought into contact with the exterior package can 16, and as a result, turn-up, breakage, damage, and the like of the electrode plate can be prevented. In the example shown in FIG. 3, the tapes 50 are each adhered only to a range of 15 mm from one of the two ends of the electrode body 14 in the axial direction. As shown in Examples which will be described below, since the tapes 50 are adhered only to the two end portions of the electrode body 14 in the axial direction other than the central portion thereof in the axial direction, an effect of suppressing the electrode plate deformation can be improved.

Although the two tapes 50 to be adhered to the two end portions of the electrode body 14 in the axial direction may have shapes and dimensions different from each other, in general, tapes having the same shape and the same dimension are used. The widths of the tapes 50 are each, for example, 5 to 12 mm. Although the tapes 50 may be adhered to the outermost circumferential surface of the electrode body 14 so as to be flush with the upper and the lower ends thereof, the tapes 50 are preferably adhered so as not to protrude from the upper and the lower ends, and hence, in consideration of the adhesion error, the tapes 50 each may be adhered so as be apart from one of the upper and the lower ends with a predetermined distance interposed therebetween.

The tape 50 is preferably adhered to the outermost circumferential surface of the electrode body 14 so as not to be overlapped with at least one of a first region 42ac corresponding to a minor arc ac and a second region 42bc corresponding to a minor arc bc shown in FIG. 2. The tape 50 is more preferably adhered so as not to be overlapped with both of the first region 42ac and the second region 42bc. That is, the tape 50 is preferably adhered to a third region 42ab corresponding to a major arc ab of the outermost circumferential surface of the electrode body 14.

In addition, the points a to c are present at the outermost circumferential surface of the electrode body 14. The point a indicates a point located at an angle of 10° with respect to a winding center a of the electrode body 14 from a position corresponding to the winding-finish side end 41e of the negative electrode mixture layers 41 toward a winding-finish side of the negative electrode 12 along the outermost circumferential surface. The point b indicates a point located at an angle of 10° from a position corresponding to the winding-finish side end 31e of the positive electrode mixture layers 31 toward a winding-start side of the positive electrode 11 along the outermost circumferential surface. In addition, the point c is a central point between the position corresponding to the winding-finish side end 31e and the position corresponding to the winding-finish side end 41e.

The winding-finish side ends 31e and 41e are preferably not overlapped with each other in the radius direction of the electrode body 14, and the angle formed between winding-finish side end 31e and the winding-finish side end 41e is, for example, preferably 10° to 60° with respect to the winding center a of the electrode body 14. Since the tape 50 is adhered to the third region 42ab of the outermost circumferential surface of the electrode body 14, even if being displaced in a manufacturing process, the tape 50 can be prevented from being adhered to positions overlapped with the winding-finish side ends 31e and 41e. The tapes 50 are preferably adhered to upper and lower end portions of the electrode body 14 in the third region 42ab along the circumferential direction of the electrode body 14. The tapes 50 are each adhered, for example, to a length range of at least 80% or at least 90% of the length of the third region 42ab along the circumferential direction of the electrode body 14.

FIGS. 4 to 7 are views showing adhesion states of tapes 50 and 51 which are other examples of the embodiment. In the example shown in FIG. 4, at the upper and the lower end portions of the exposed portion 42, the tapes 50 are each adhered to a position which is not overlapped with the winding-finish side end 31e of the positive electrode mixture layers 31 in the radius direction of the electrode body 14. On the other hand, the tapes 50 are each adhered to a position which is overlapped with the winding-finish side end 41*e* of the negative electrode mixture layers 41. In the example shown in FIG. 5, at the upper and the lower end portions of the exposed portion 42, the tapes 50 are each adhered to a position which is not overlapped with the winding-finish side end 41*e* and which is overlapped with the winding-finish side end 31*e*.

Figure 6:
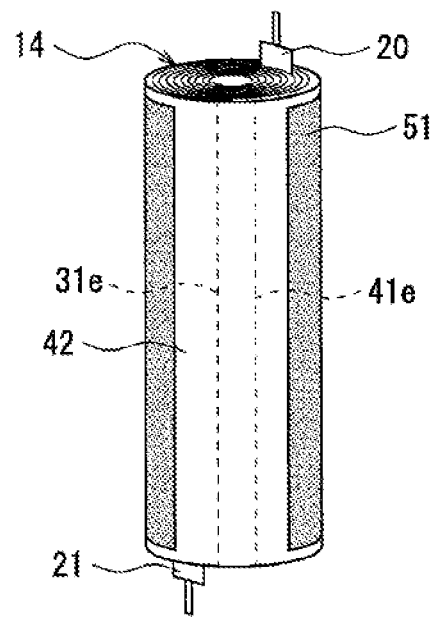
FIG. 6 is a perspective view of an electrode body which is another example of the embodiment.
Figure 7:
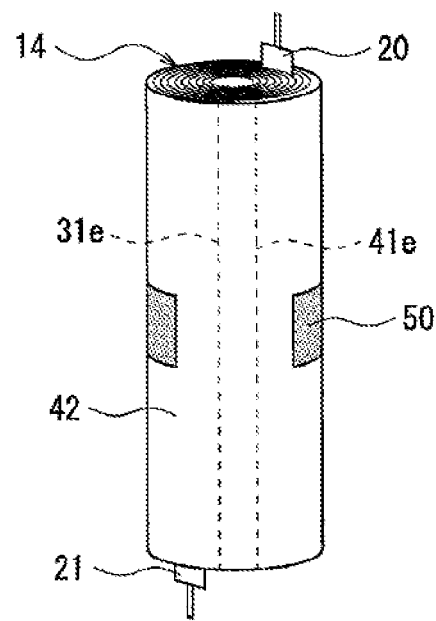
FIG. 7 is a perspective view of an electrode body which is another example of the embodiment.

In the examples shown in FIGS. 6 and 7, since the tapes 50 and 51 are each adhered to the exposed portion 42 at a position other than that to be overlapped with the winding-finish side ends 31*e* and 41*e*, the above examples are each similar to the example shown in FIG. 3. On the other hand, in the example shown in FIG. 6, since the width (length in an up-to-down direction) of the tape 51 is larger than the width of the tape 50, and the tape 51 is adhered to approximately the whole length of the electrode body 14 in the axial direction thereof, the example shown in FIG. 6 is different from the example shown in FIG. 3. In the third region 42*ab* (see FIG. 2), for example, the tape 51 is adhered to a wide range including the two end portions and the central portion in the up-to-down direction. In the example shown in FIG. 7, the tape 50 is adhered only to the central portion of the exposed portion 42 (third region 42*ab*) in the up-to-down direction, and this point is different from that of the example shown in FIG. 3.

EXAMPLES

Hereafter, although the present disclosure will be described with reference to Examples, the present disclosure is not limited to the following Examples.

Example 1

[Formation of Positive Electrode]

After 100 parts by mass of $LiNi_{0.88}Co_{0.09}Al_{0.03}O_2$, 1 part by mass of acetylene black, and 0.9 parts by mass of poly(vinylidene fluoride) were mixed together, an appropriate amount of N-methyl-2-pyrrolidone was added, so that a positive electrode mixture slurry was prepared. Subsequently, the positive electrode mixture slurry was applied on two surfaces of a long positive electrode collector formed of aluminum foil having a thickness of 15 μm, and coating films thus formed were then dried. After the dried coating films were pressed using a roller machine, cutting was performed to obtain a predetermined electrode size, so that a positive electrode (thickness: 0.144 mm, width: 62.6 mm, length: 861 mm) in which positive electrode mixture layers were formed on the two surfaces of the positive electrode collector was formed. At a central portion of the positive electrode in a longitudinal direction thereof, an exposed portion at which the mixture layers were not present and at which the collector surface was exposed was provided, and an aluminum-made positive electrode tab was welded to the exposed portion.

[Formation of Negative Electrode]

After 95 parts by mass of a graphite powder, 5 parts by mass of a Si oxide, 1 part by mass of sodium carboxymethyl cellulose, and 1 part by mass of a dispersion of a styrene-butadiene rubber were mixed together, an appropriate amount of water was added, so that a negative electrode mixture slurry was prepared. Subsequently, the negative electrode mixture slurry was applied on two surfaces of a long negative electrode collector formed of copper foil having a thickness of 8 μm, and coating films thus formed were then dried. After the dried coating films were pressed using a roller machine, cutting was performed to obtain a predetermined electrode size, so that a negative electrode (thickness: 0.160 mm, width: 64.2 mm, length: 959 mm) in which negative electrode mixture layers were formed on the two surfaces of the negative electrode collector was formed. An exposed portion at which the mixture layers were not present and at which the collector surface was exposed was provided at one end portion (end portion located at a winding-finish side of an electrode body) of the negative electrode in a longitudinal direction thereof, and a nickel-made negative electrode tab was welded to the exposed portion.

[Formation of Electrode Body]

The positive electrode and the negative electrode were spirally wound with separators each formed of a polyethylene-made film interposed therebetween, so that a winding type electrode body was formed. An outermost circumferential surface of the electrode body was entirely an exposed portion at which the surface of the negative electrode collector was exposed. Tapes were each adhered to the outermost circumferential surface of the electrode body including a winding-finish end of the negative electrode so as not to be overlapped with a winding-finish side end of the positive electrode mixture layers and a winding-finish side end of the negative electrode mixture layers in a radius direction of the electrode body, so that the winding structure of the electrode body was maintained. As the tape, a polypropylene-made tape having a thickness of 30 μm, a width (length along an up-to-down direction of the electrode body) of 9 mm, and a length (length along a circumferential direction of the electrode body) of 50 mm was used. As shown in FIG. 3, two tapes were adhered to ranges of 15 mm from the two end portions of the electrode body in an axial direction.

[Preparation of Nonaqueous Electrolyte Solution]

Ethylene carbonate (EC) and dimethyl carbonate (DMC) were mixed together at an EC/DMC volume ratio of 3/7. Next, 5 percent by mass of vinylene carbonate was added to the mixed solvent thus formed, and $LiPF_6$ was dissolved at a concentration 1.5 mol/L, so that a nonaqueous electrolyte solution was prepared.

[Formation of Battery]

After insulating plates were disposed on the top and the bottom of the electrode body, a negative electrode lead was welded to a battery case, and a positive electrode lead was also welded to a sealing body, the electrode body was received in an exterior package can. Subsequently, after the nonaqueous electrolyte liquid was charged in the exterior package can, an opening end portion of the exterior package can was caulked with the sealing body with a gasket interposed therebetween to seal the battery case, so that a cylindrical nonaqueous electrolyte secondary battery was formed. The capacity of the battery was 4,600 mAh.

Example 2

Except for that the tapes used in Example 1 were each adhered to the outermost circumferential surface of the electrode body so as to be overlapped with the winding-finish side end of the negative electrode mixture layers in the radius direction of the electrode body and not to be overlapped with the winding-finish side end of the positive electrode mixture layers (see FIG. 4), a battery was formed in a manner similar to that of Example 1.

Example 3

Except for that the tapes used in Example 1 were each adhered to the outermost circumferential surface of the electrode body so as to be overlapped with the winding-finish side end of the positive electrode mixture layers in the radius direction of the electrode body and not to be overlapped with the winding-finish side end of the negative electrode mixture layers (see FIG. 5), a battery was formed in a manner similar to that of Example 1.

Example 4

Except for that a polypropylene-made tape (one tape) having a width 62 mm was adhered in a range including a central portion and two end portions of the electrode body in the axial direction (see FIG. 6), a battery was formed in a manner similar to that of Example 1.

Example 5

Except for that the tape (one tape) used in Example 1 was adhered to a central portion of the electrode body in the axial direction (see FIG. 7), a battery was formed in a manner similar to that of Example 1.

Comparative Example 1

Except for that polypropylene-made tapes (two tapes) having a length of 62 mm were each adhered to a range of 15 mm from one of the two end portions of the electrode body in the axial direction so as to be overlapped with the winding-finish side end of the positive electrode mixture layers and the winding-finish side end of the negative electrode mixture layers in the radius direction of the electrode body, a battery was formed in a manner similar to that of Example 1.

[Cycle Test]

In a temperature environment at 25° C., the batteries of Examples and Comparative Example were each charged to a battery voltage of 4.2 V at a constant current of 1,380 mA (0.3 hour rate), and a constant voltage charge was then performed to a final current of 92 mA. Subsequently, after a rest was taken for 20 minutes, a constant current discharge was performed at 4,600 mA (one hour rate), and a rest was taken for 20 minutes. This charge/discharge cycle was repeatedly performed 500 cycles.

[Evaluation of Electrode Plate Deformation (see FIG. 8)]

Figure 8:
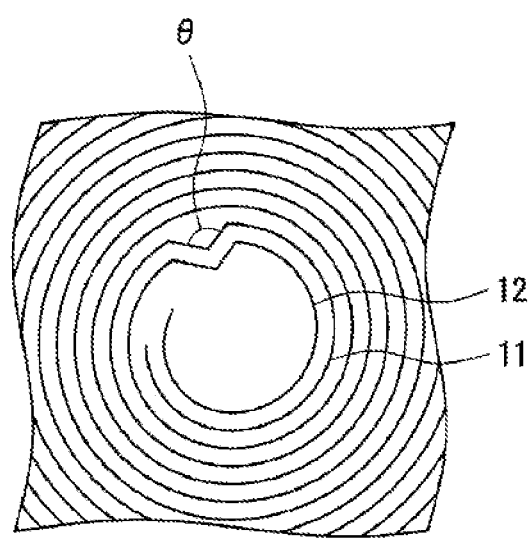
FIG. 8 is a view illustrating an evaluation method of electrode plate deformation.

After the battery processed by the above cycle test was charged to a battery voltage of 4.2 V at a constant current of 1,380 mA (0.3 hour rate), and a constant voltage charge was then performed to a final current of 92 mA, by the use of an X-ray CT apparatus (SMX-225CT FPD HR, manufactured by Shimadzu Corporation), a cross-sectional observation in the vicinity of a winding center of the electrode body was performed. As shown in FIG. 8, when a deformation (bending) of the electrode plate (at least one of the positive electrode and the negative electrode) at an angle $\theta$ of 150° or less was confirmed, it was judged that the electrode plate deformation occurred. The electrode plate deformation was evaluated based on the following criteria, and the evaluation results are shown in Table 1.

○: no electrode plate deformation was confirmed.

Δ: electrode plate deformation of one layer was confirmed.

x: electrode plate deformation of at least two layers was confirmed.

TABLE 1

| | OVERLAP WITH TAPE | | TAPE POSITION IN | TAPE WIDTH/ | TAPE LENGTH/ | EVALUATION OF ELECTRODE PLATE |
|---|---|---|---|---|---|---|
| | E1 | E2 | AXIAL DIRECTION | mm | mm | DEFORMATION |
| EXAMPLE 1 | NO | NO | TWO END PORTIONS | 9 | 50 | ○ |
| EXAMPLE 2 | NO | YES | TWO END PORTIONS | 9 | 50 | ○ |
| EXAMPLE 3 | YES | NO | TWO END PORTIONS | 9 | 50 | ○ |
| EXAMPLE 4 | NO | NO | WHOLE LENGTH | 62 | 50 | Δ |
| EXAMPLE 5 | NO | NO | CENTRAL PORTION | 9 | 50 | Δ |
| COMPARATIVE EXAMPLE 1 | YES | YES | TWO END PORTIONS | 9 | 62 | x |

E1: WINDING-FINISH SIDE END OF POSITIVE ELECTRODE MIXTURE LAYERS,
E2: WINDING-FINISH SIDE END OF NEGATIVE ELECTRODE MIXTURE LAYERS

From the results shown in Table 1, it is found that compared to the battery of Comparative Example, in all the batteries of Examples, the electrode plate deformation after the cycle test is not likely to occur. In particular, when the tapes were adhered only to the two end portions of the electrode body in the axial direction (Examples 1 to 3), an effect of suppressing the electrode plate deformation is improved. The reason for this is believed that since the central portion of the electrode body in the axial direction is liable to be expanded by the charge/discharge cycles, when the tapes are adhered to portions other than the above portion, the effect of suppressing the electrode plate deformation is improved.

It is believed that since the mixture layer has a thickness larger than that of the collector, and a step is formed at the winding-finish side end of the mixture layers, a stress generated in association with the expansion of the electrode body is concentrated on this winding-finish side end and may be partially responsible for the electrode plate deformation. In addition, a tape adhesion mode is deeply involved in this electrode plate deformation. In the batteries of Examples, since at least one tape is disposed at a position other than that to be overlapped with the winding-finish side end of the mixture layers, the concentration of the stress can be reduced, and hence, the electrode plate deformation is suppressed. On the other hand, in the battery of Comparative Example, it is believed that since the concentration of the stress cannot be sufficiently reduced, the electrode plate deformation occurs.

REFERENCE SIGNS LIST

10 nonaqueous electrolyte secondary battery, 11 positive electrode, 12e, 31e, 41e winding-finish side end, 12 negative electrode, 13 separator, 14 electrode body, 15 battery case, 16 exterior package can, 17 sealing body, 18, 19 insulating plate, 20 positive electrode tab, 21 negative electrode tab, 22 groove portion, 23 filter, 24 lower valve, 25 insulating member, 26 upper valve, 27 cap, 28 gasket, 30 positive electrode collector, 31 positive electrode mixture layer, 40 negative electrode collector, 41 negative electrode mixture layer, 42 exposed portion, 42*ac* first region, 42*bc* second region, 42*ab* third region, 50, 51 tape

The invention claimed is:

1. A nonaqueous electrolyte secondary battery comprising: a winding type electrode body which includes a positive electrode composed of positive electrode mixture layers provided on two surfaces of a positive electrode collector, a negative electrode composed of negative electrode mixture layers provided on two surfaces of a negative electrode collector, and at least one separator provided between the positive electrode and the negative electrode, wherein the electrode body has an exposed portion at which the negative electrode collector is exposed at an outermost circumferential surface and is provided with at least one tape which is adhered to the outermost circumferential surface so as to extend from a winding-finish side end portion of the negative electrode and past a winding-finish end of the electrode body, and at the outermost circumferential surface of the electrode body, with respect to a winding center of the electrode body, when a point located at an angle of 10° from a position corresponding to the winding-finish side end of the negative electrode mixture layers toward a winding-finish side of the negative electrode along the outermost circumferential surface is designated as a, a point located at an angle of 10° from a position corresponding to the winding-finish side end of the positive electrode mixture layers toward a winding-start side of the positive electrode along the outermost circumferential surface is designated as b, and a central point between the position corresponding to the winding-finish side end of the negative electrode mixture layers and the winding-finish side end of the positive electrode mixture layers is designated as c, the tape is adhered to a region other than: (i) a region corresponding to a minor arc ac and (ii) a region corresponding to a minor arc bc.

2. The aqueous electrolyte secondary battery according to claim 1,
wherein the tape is at least partially adhered to ranges of 15 mm from two ends of the electrode body in an axial direction.

3. The aqueous electrolyte secondary battery according to claim 1,
wherein the tapes are adhered only to ranges of 15 mm from two ends of the electrode body in an axial direction.

4. The aqueous electrolyte secondary battery according to claim 1,
wherein the tape extends across a length range of at least 80% of a length, along a circumferential direction of the outermost circumferential surface of the electrode body, of said region other than: (i) the region corresponding to the minor arc ac and (ii) the region corresponding to the minor arc bc.

* * * * *